(12) United States Patent
Weathers et al.

(10) Patent No.: US 11,028,969 B2
(45) Date of Patent: Jun. 8, 2021

(54) STRUCTURAL INTERFACE HARDWARE FOR CRYOGENIC TANKS

(71) Applicant: The Boeing Company, Chicago, IL (US)

(72) Inventors: James Weathers, Huntsville, AL (US); Jeffrey Weathers, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 16/430,146

(22) Filed: Jun. 3, 2019

(65) Prior Publication Data

US 2020/0378560 A1 Dec. 3, 2020

(51) Int. Cl.
*F17C 13/08* (2006.01)
*F16B 13/00* (2006.01)
*F16M 13/02* (2006.01)

(52) U.S. Cl.
CPC ............ *F17C 13/086* (2013.01); *F16B 13/00* (2013.01); *F16M 13/02* (2013.01); *F16B 2013/006* (2013.01); *F17C 2205/0103* (2013.01)

(58) Field of Classification Search
CPC .............. F16B 13/045; F16B 2013/006; F17C 13/086; F17C 2205/0103; F24S 2025/021
USPC ..................................................... 248/213.2
See application file for complete search history.

(56) References Cited

U.S. PATENT DOCUMENTS

| | | | | |
|---|---|---|---|---|
| 1,616,232 A * | 2/1927 | Roberts | ................... | E05D 15/00 411/338 |
| 3,245,571 A * | 4/1966 | Canty | ................... | F17C 13/086 220/560.1 |
| 3,446,388 A * | 5/1969 | Greenberg | ............ | F17C 13/086 220/562 |
| 4,033,243 A * | 7/1977 | Kirrish | ................... | F16B 37/145 411/338 |
| 4,490,083 A * | 12/1984 | Rebish | ...................... | F16B 5/02 411/338 |
| 5,290,131 A * | 3/1994 | Henriksen | ............. | F16B 37/145 411/180 |
| 6,589,244 B1 * | 7/2003 | Sevrain | ................ | A61B 17/688 411/338 |
| 7,584,582 B1 * | 9/2009 | Hutter, III | ................. | B64C 1/40 156/91 |
| 8,210,785 B1 * | 7/2012 | Gager | ..................... | E03D 11/16 411/429 |
| 9,470,257 B2 * | 10/2016 | Balderrama | ............ | B64C 1/403 |
| 10,151,114 B2 * | 12/2018 | Stearns | ................... | E04D 13/00 |

(Continued)

*Primary Examiner* — Bradley Duckworth
(74) *Attorney, Agent, or Firm* — Kunzler Bean & Adamson

(57) ABSTRACT

Disclosed herein is an attachment system, for providing a component mounting location, that comprises a laminated structure and a bracket. The bracket comprises an interface surface configured to interface with a first side of the structure, and a through hole open at the interface surface. A shear stud of the attachment system comprises a projection, shaped to pass through the hole of the structure and engage the through hole of the bracket, and a seal region, positioned to interface with a second side of the structure to form a seal with the second side of the structure. The attachment system additionally comprises a fastener comprising a head and a shaft, the shaft being shaped to pass through the through hole in the bracket and engage the shear stud to secure the shear stud relative to the bracket thereby reducing shear at the fastener.

20 Claims, 6 Drawing Sheets

(56) References Cited

U.S. PATENT DOCUMENTS

| | | | |
|---|---|---|---|
| 10,502,251 B2* | 12/2019 | Banihashemi | F16B 5/02 |
| 2005/0169728 A1* | 8/2005 | Attanasio | B64C 1/12 |
| | | | 411/352 |
| 2016/0134230 A1* | 5/2016 | Meine | H02S 20/23 |
| | | | 52/698 |
| 2018/0106420 A1* | 4/2018 | Schumacher | F16B 13/045 |

* cited by examiner

STRUCTURAL INTERFACE HARDWARE FOR CRYOGENIC TANKS

GOVERNMENT LICENSE RIGHTS

This invention was made with Government support under HR0011-17-9-0001 awarded by the Defense Advanced Research Projects Agency. The government has certain rights in this invention.

EXPORT LICENSE STATEMENT

This technical information requires an export license prior to dissemination to foreign persons. It is controlled by United States International Traffic in Arms Regulations (ITAR) (22 C.F.R. 120130). It is the responsibility of each individual in control of this data to abide by all export laws.

FIELD

This disclosure relates generally to interface hardware, and more specifically to structural interface hardware for cryogenic tanks.

BACKGROUND

Tanks and other containment structures may benefit from the presence or availability of attachment points or mounting hardware to secure or attach objects or systems to the structure. This hardware could be formed into the structure during manufacture or installed after manufacture of the structure. Post-manufacture installation may include surface mounting or through-hole mounting.

SUMMARY

The subject matter of the present application has been developed in response to the present state of the art, and in particular, in response to the shortcomings associated with cryogenic tank wall structural interfaces, that have not yet been fully developed using currently available technology. Accordingly, the subject matter of the present application has been developed to provide tank interface hardware that overcomes at least some of the shortcomings of prior designs.

The following is a non-exhaustive list of examples, which may or may not be claimed, of the subject matter, disclosed herein.

Disclosed herein is an attachment system for providing a component mounting location. The attachment system comprises a laminated structure comprising a first side, a second side, opposite the first side, and a hole extending from the first side to the second side. The attachment system also comprises a bracket comprising an interface surface, configured to interface with the first side of the structure, and a through hole open at the interface surface. The attachment system further comprises a shear stud configured to interface with the second side of the structure. The shear stud comprises a projection extending along a central axis of the shear stud and shaped to pass through the hole of the structure and engage the through hole of the bracket. The shear stud also comprises a seal region surrounding the projection of the shear stud and positioned to interface with the second side of the structure to form a seal with the second side of the structure. The attachment system additionally comprises a fastener comprising a head and a shaft. The shaft is shaped to pass through the through hole in the bracket and engage the shear stud to secure the shear stud relative to the bracket thereby reducing shear at the fastener. The preceding subject matter of this paragraph characterizes example 1 of the present disclosure.

The seal region further comprises a seal element to form the seal between the first side of the structure and the second side of the structure. The preceding subject matter of this paragraph characterizes example 2 of the present disclosure, wherein example 2 also includes the subject matter according to example 1, above.

The seal region further comprises a second seal element to form a redundant seal between the first side of the structure and the second side of the structure. The preceding subject matter of this paragraph characterizes example 3 of the present disclosure, wherein example 3 also includes the subject matter according to example 2, above.

The first seal element comprises a flexible material. The preceding subject matter of this paragraph characterizes example 4 of the present disclosure, wherein example 4 also includes the subject matter according to any one of examples 2-3, above.

The first seal element is a flexible c-channel ring disposed in the seal region. The preceding subject matter of this paragraph characterizes example 5 of the present disclosure, wherein example 5 also includes the subject matter according to any one of examples 2-4, above.

At least one of the shear stud or the bracket further comprises an alignment feature to orient the shear stud relative to the bracket to correspond to a geometry of the structure. The preceding subject matter of this paragraph characterizes example 6 of the present disclosure, wherein example 6 also includes the subject matter according to any one of examples 1-5, above.

The attachment system further comprises a loading element to apply a load at the fastener. The preceding subject matter of this paragraph characterizes example 7 of the present disclosure, wherein example 7 also includes the subject matter according to any one of examples 1-6, above.

The loading element comprises a disc spring. The preceding subject matter of this paragraph characterizes example 8 of the present disclosure, wherein example 8 also includes the subject matter according to example 7, above.

At least one of the interface surface of the bracket or the seal region of the shear stud comprises a non-planar geometry corresponding to a non-planar geometry of the first side or the second side, respectively, of the structure. The preceding subject matter of this paragraph characterizes example 9 of the present disclosure, wherein example 9 also includes the subject matter according to any one of examples 1-8, above.

The structure is a thin-wall composite forming a portion of a cryogenic tank. The preceding subject matter of this paragraph characterizes example 10 of the present disclosure, wherein example 10 also includes the subject matter according to any one of examples 1-9, above.

At least one of the bracket or the shear stud comprises a material having a similar thermal characteristic to the structure. The preceding subject matter of this paragraph characterizes example 11 of the present disclosure, wherein example 11 also includes the subject matter according to any one of examples 1-10, above.

Also disclosed herein is a shear stud. The shear stud comprises a seal region extending radially outward from a central axis to a periphery of the shear stud. The shear stud also comprises a projection extending out from the seal region and along the central axis. The shear stud further comprises a receptacle formed in a center of the projection to be open at an end of the projection distal from the seal region and to extend into the projection along the central axis. The receptacle is shaped to receive a fastener. The shear stud also comprises a closed face positioned on a side of the seal region opposite the projection. The closed face extends from the central axis to the periphery of the shear stud. The preceding subject matter of this paragraph characterizes example 12 of the present disclosure.

The seal region further comprises a first seal element disposed within a first seal channel. The preceding subject matter of this paragraph characterizes example 13 of the present disclosure, wherein example 13 also includes the subject matter according to example 12, above.

The seal region further comprises a second seal element disposed within a second seal channel concentric with the first seal channel. The preceding subject matter of this paragraph characterizes example 14 of the present disclosure, wherein example 14 also includes the subject matter according to example 13, above.

The receptacle extends through the projection without extending through the closed face. The preceding subject matter of this paragraph characterizes example 15 of the present disclosure, wherein example 15 also includes the subject matter according to any one of examples 12-14, above.

The receptacle comprises a removeable sleeve. The preceding subject matter of this paragraph characterizes example 16 of the present disclosure, wherein example 16 also includes the subject matter according to any one of examples 12-15, above.

Further disclosed herein is a method of coupling a bracket to a first side of a structure. The method comprises positioning a shear stud in a structure. A seal region of the shear stud is positioned on a second side of the structure and a projection of the shear stud extends through a thickness of the structure to the first side of the structure. The method also comprises aligning the bracket with the projection of the shear stud on the first side of the structure opposite the seal region. The bracket comprises an aperture having a geometry corresponding to the projection of the shear stud. The method further comprises coupling a fastener to the shear stud to secure the bracket relative to the shear stud on first side of the structure. The preceding subject matter of this paragraph characterizes example 17 of the present disclosure.

The method further comprises disposing a loading element between the fastener and the bracket to apply a loading force on the fastener. The preceding subject matter of this paragraph characterizes example 18 of the present disclosure, wherein example 18 also includes the subject matter according to example 17, above.

The step of aligning the bracket with the projection of the shear stud comprises positioning the projection to match an alignment feature of the shear stud with a corresponding portion of the bracket to facilitate a sealing engagement of the seal region of the shear stud with the structure. The preceding subject matter of this paragraph characterizes example 19 of the present disclosure, wherein example 19 also includes the subject matter according to any one of examples 17-18, above.

Securing the bracket relative to the shear stud on the structure forms a sealing engagement between the seal region of the shear stud and the structure. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
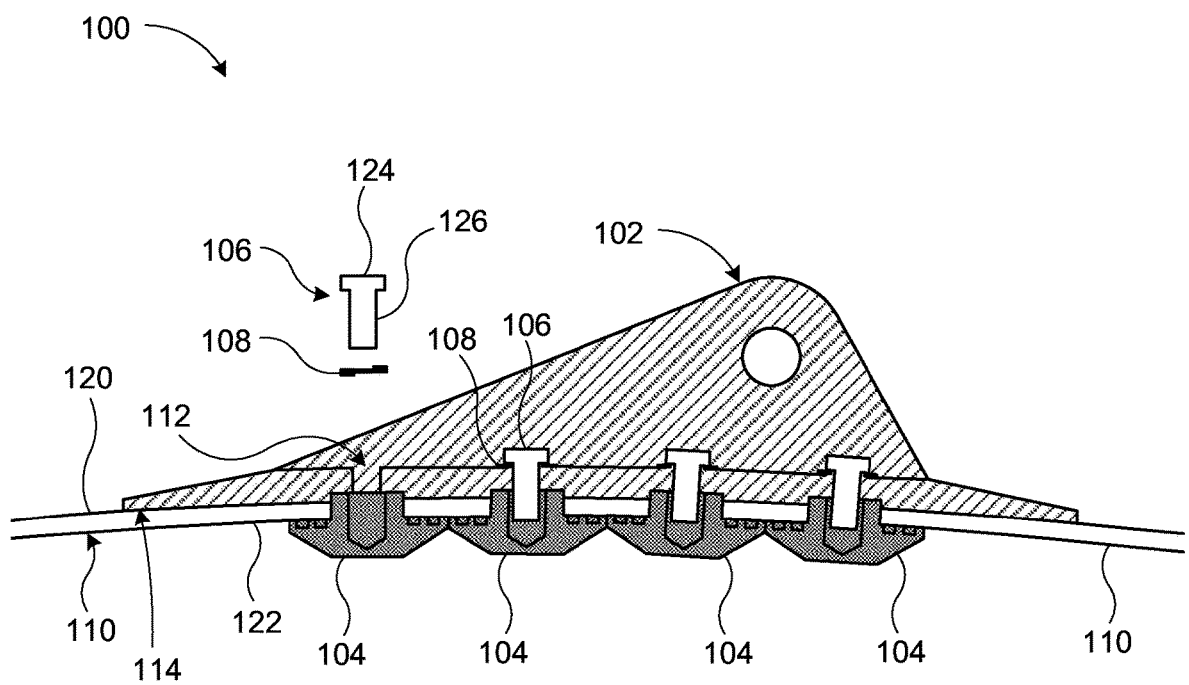
FIG. 1 is a cross-sectional view of an attachment system, according to one or more examples of the present disclosure.

Referring to FIG. 1, one example of an attachment system 100 is shown. The attachment system 100 may provide a mounting location for receiving or facilitating connection to the attachment system 100. The attachment system 100 includes a structure 110, a bracket 102, a shear stud 104, and a fastener 106. The structure 110 has a laminate geometry formed by a first side 120 and a second side 122 opposite the first side 120. In some examples, the structure 110 is a cryogenic tank wall, another container, a sheet good, a fuselage, a housing, or the like. The structure 110 is made from a material, such as a composite made of one or more natural or synthetic materials, in certain examples. According to various examples, the structure 110 is flat, curved, angled, or may have other geometries. The structure 110 may include distinct layers or may be homogenous. Moreover, the structure 110 may have a uniform or varied thickness.

The bracket 102 includes an interface surface 114 configured to interface with the first side 120 of the structure 110. The interface surface 114 may extend over a portion or over an entire length of the bracket 102. The interface surface 114 may be shaped to match a geometry of the structure 110. For example, if the structure 110 has a curved geometry, the interface surface 114 may be curved to match the geometry of the structure 110. The interface surface 114 may include chemicals, textures, surface features, or other treatments, compounds, or the like to facilitate engagement of the interface surface 114 with the structure 110 along some or all of the interface surface 114. Alternatively, the structure 110 may include chemicals, textures, surface features, or other treatments, compounds, or the like to facilitate engagement of the interface surface 114 with the structure 110. As shown herein, the interface surface 114 of the bracket 102 has a rectangular geometry. In other examples, the bracket 102 may have a non-rectangular geometry.

The bracket 102 may include materials which have one or more material properties similar to one or more material properties of the structure 110. For example, the bracket 102 may have similar thermal characteristics, such as the coefficient of thermal expansion, to the structure 110. This may improve alignment of the bracket 102 and the structure 110 and reduce strain/stress mismatch at one or more operating temperatures.

One or more through holes 112 may be included in the bracket 102. In the illustrated embodiments, the illustrated plurality of through holes 112 are evenly spaced along the bracket 102. Alternatively, the plurality of through holes 112 may be positioned in relative patterns, concentrations, and arrangements in the bracket 102.

Each through hole 112 may be cylindrical in geometry or may have a non-cylindrical geometry. The through hole 112 may have a compound geometry in which the geometry, such as the diameter, varies with respect to the length of the through hole 112. In the illustrated embodiment, a portion of the through hole 112 proximal the interface surface 114 has a larger geometry than a portion of the through hole 112 distal to the interface surface 114 of the bracket 102. The varied geometry may facilitate engagement of the shear stud 104 with the bracket 102 through the structure 110.

Figure 2:
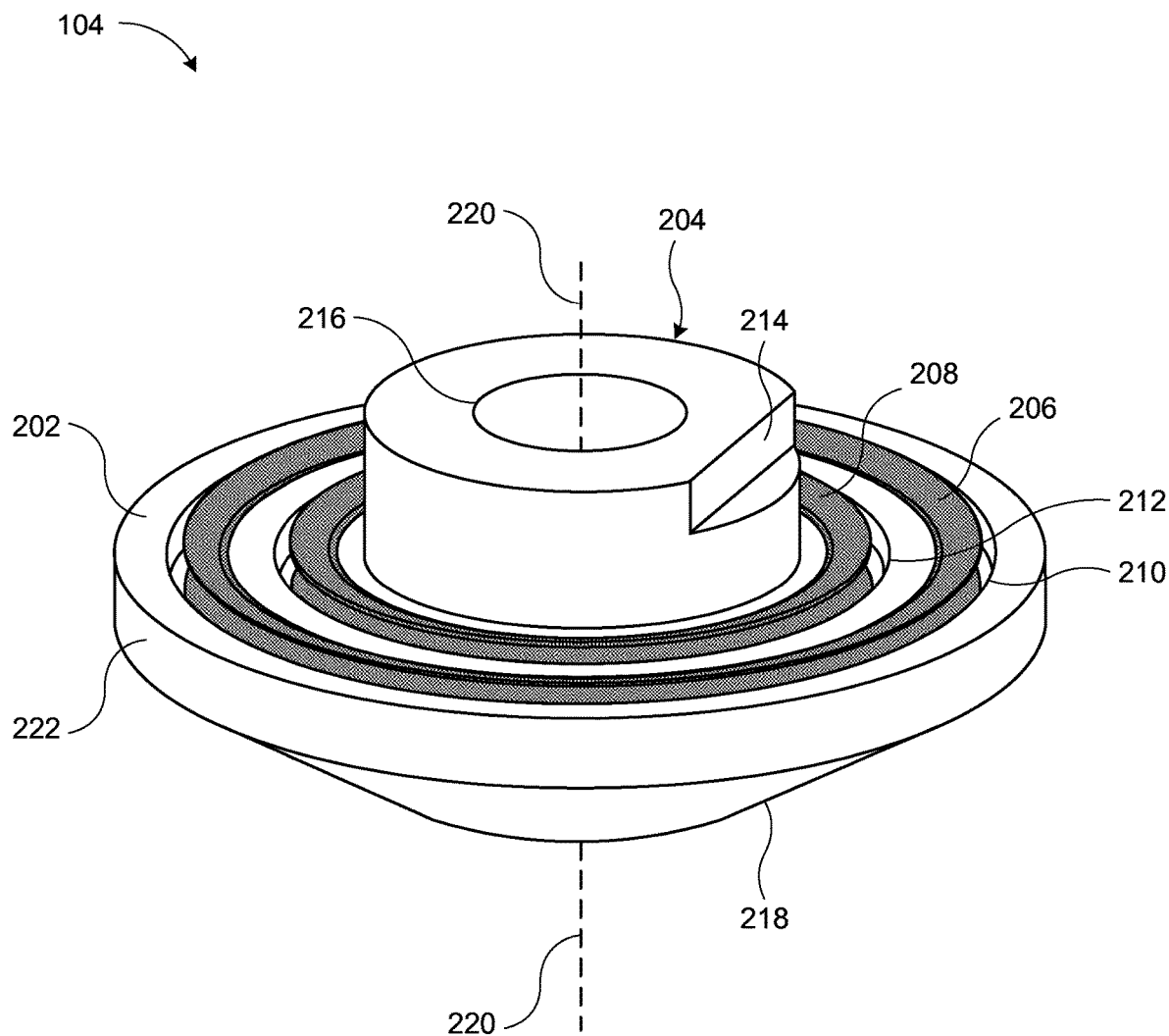
FIG. 2 is a perspective view of a shear stud, according to one or more examples of the present disclosure.

The shear stud 104 is configured to interface with the second side 122 of the structure 110 opposite the first side 120. As shown in the illustrated embodiment of FIG. 2, the shear stud 104 includes a projection 204 extending from the shear stud 104 along a central axis 220 and shaped to pass through the structure 110. The projection 204 engages with the through hole 112 in the bracket 102.

The shear stud 104 also includes a seal region 202 surrounding the projection 204 of the shear stud 104. The seal region 202 is configured to interface with the second side 122 of the structure 110 to form a seal with the second side 122 of the structure 110.

The seal region 202 may further include a first seal element 206. The first seal element 206 may form the seal between the first side 120 of the structure 110 and the second side 122 of the structure 110. The first seal element 206 may include a flexible material. Additionally, the first seal element 206 may be a flexible c-channel ring disposed in the seal region 202. In the illustrated embodiment, the seal region 202 may further include a second seal element 208 to form a redundant or supplemental seal between the first side 120 of the structure 110 and the second side 122 of the structure 110. The first seal element 206 and the second seal element 208 may be similar in shape, size, construction, and the like.

In the illustrated embodiment, the first seal element 206 is disposed within a first seal channel 210. Similarly, the second seal element 208 may be disposed in a second seal channel 212. The second seal channel 212 may be concentric with the first seal channel 210. The first seal channel 210 and the second seal channel 212 may be of similar size or shape or may be of disparate size or shape. In the illustrated embodiment, the first seal channel 210 is positioned to surround the second seal channel 212. Alternatively, the second seal channel 212 may be positioned to surround the first seal channel 210. The first seal channel 210 and the second seal channel 212 may be concentric with one another. Other relative positions and orientations may also be used.

Returning to FIG. 1, the attachment system 100 further includes a fastener 106. The fastener 106 includes a head 124 coupled to a shaft 126. The shaft 126 is shaped to pass through the through hole 112 in the bracket 102 and engage with the shear stud 104 to secure the shear stud 104 relative to the bracket. This configuration reduces the shear load reacted by the fastener 106. The fastener 106 may be removably engaged with the projection 204 or non-removably engaged. For example, the fastener 106 may engage with the projection 204 of the shear stud 104 via threading, friction fitting, welding, adhesives, bonding, riveting, or the like.

The attachment system 100 may also include a loading element 108 to apply a load at the fastener 106. The loading element 108 may be a disc spring, washer, gasket, or other resilient structure to maintain engagement of the shear stud 104 with the bracket 102. For example, a change in temperature at the attachments system 100 may cause expansion or contraction of components of the attachment system 100. The loading element 108 may reduce separation of the components to maintain seal, reduce stress or strain in the system 100, reduce vibration or other displacement, reduce damage to a component, or the like. In some embodiments, the attachment system 100 is incorporated on a cryogenic tank or other containing structure. In such implementations, maintaining a seal is critical to prevent or reduce leakage or contamination.

Referring again to FIG. 2, the depicted shear stud 104 includes the seal region 202 extending radially outward from the central axis 220 to periphery 222 of the shear stud 104. The projection 204 extends out from the seal region 202 and along the central axis 220. The shear stud 104 also includes a receptacle 216 formed in a center of the projection 204 to be open at an end of the projection 204 distal from the seal region 202. The receptacle 216 extends into the projection 204 along the central axis 202 and is shaped to receive the fastener 106. The shear stud 104 also includes a closed face 218 positioned on a side of the seal region 202 opposite the projection 204. The closed face 218 extends from the central axis 220 to the periphery 222 of the shear stud 104. The closed face 218 may have a conical shape to reduce mass and materials requirements or may have other shapes or geometries.

Figure 3:
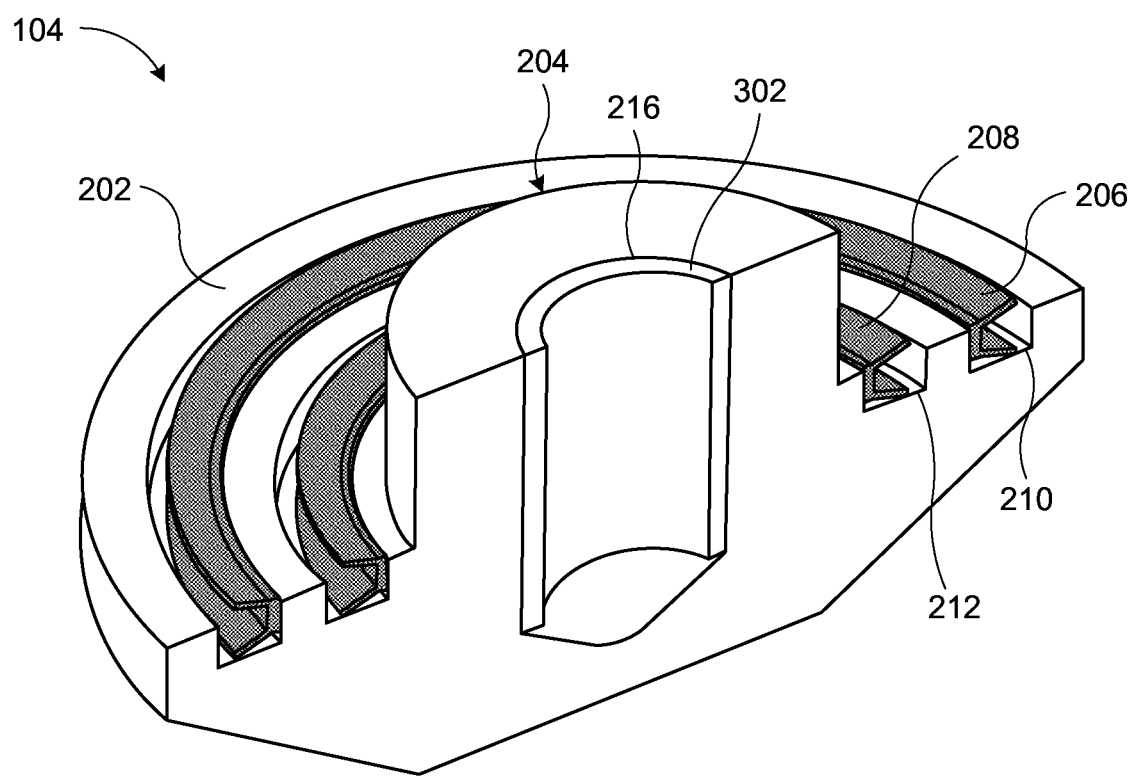
FIG. 3 is a cross-sectional view of the shear stud of FIG. 2, according to one or more examples of the present disclosure.

Referring now to FIG. 3, receptacle 216 extends through the projection 204 without extending through the closed surface 218. The receptacle 216 may include a sleeve 302. The sleeve 302 may be removeable or permanently formed within the receptacle 216. The sleeve 302 may adjust a size of the receptacle 216 or provide a retaining feature to accept the fastener 106.

In the cross-sectional view of FIG. 3, the shape of the seal elements 206 and 208 can be seen. In the illustrated embodiment, the seal elements 206 and 208 have a c-shaped geometry. This geometry may allow for flexibility of the seal elements 206 and 208 in forming a seal between the shear stud 104 and the structure 110. The geometry of the seal channels 210 and 212 may correspond to the geometry of the seal elements 206 and 208.

Figure 4:
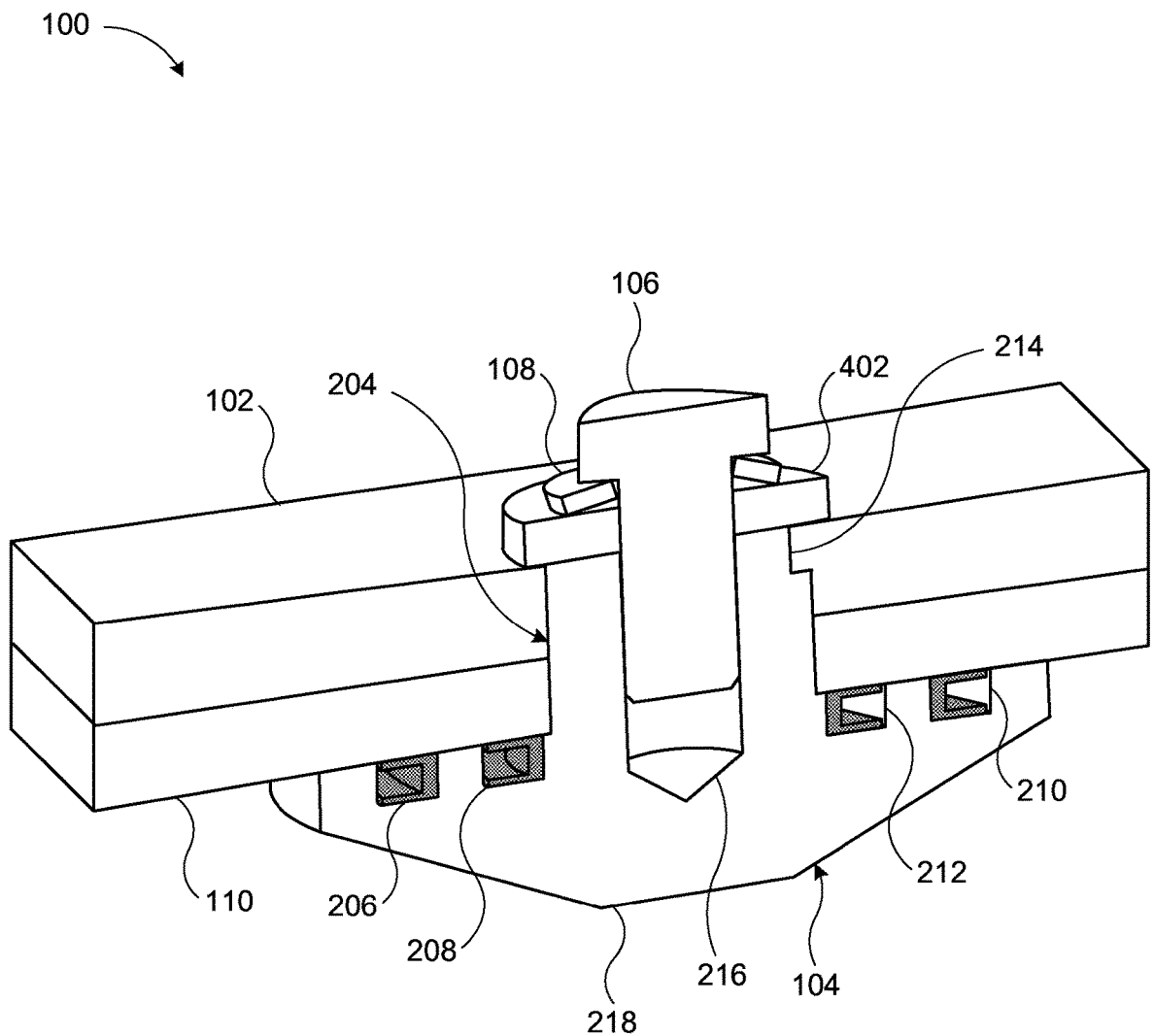
FIG. 4 is a cross-sectional view of the shear stud of FIG. 2 in the attachment system of FIG. 1, according to one or more examples of the present disclosure.

Referring to FIG. 4, an alternative arrangement is shown. In this illustrated arrangement, a retention element 402 is incorporated between the loading element 108 and the bracket 102. The retention element 402 spans the width of the projection 204 to secure the bracket 102 relative to the shear stud 104. In this manner, the projection 204 extends fully through the structure 110 and the bracket 102.

Additionally, at least one of the shear studs 104 or brackets 102 includes an alignment feature 214. The alignment feature 214 orients the shear stud 104 relative to the bracket 102 to correspond to a geometry of the structure 110. For example, if the structure 110 has a curved geometry, the alignment feature 214 facilitates alignment of the shear stud 104 and the bracket 102 to match the curved geometry of the structure 110 to improve the seal at the structure 110. The alignment feature 214 is shown as a flattened portion in an otherwise round geometry but may be a key, tab, slot, tooth, or the like.

Figure 5:
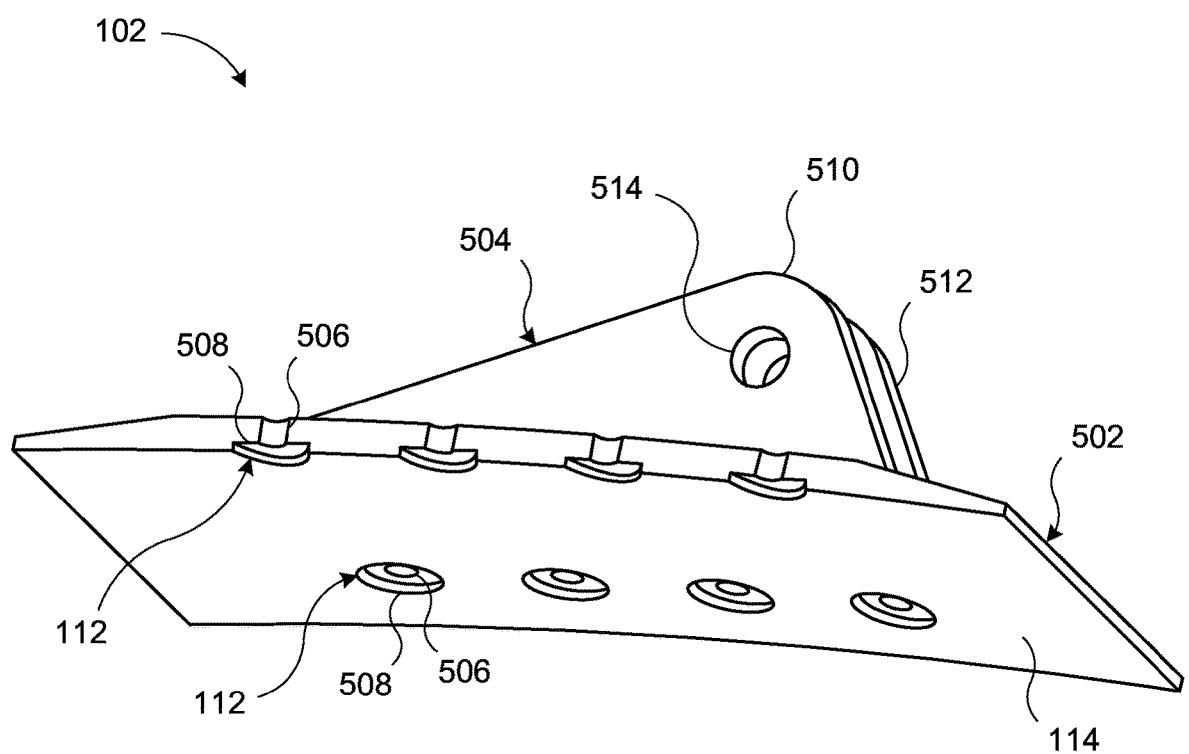
FIG. 5 is a perspective view of a bracket associated with the attachment system of FIG. 1, according to one or more examples of the present disclosure.

Referring now to FIG. 5, the bracket 102 includes a base 502 and clevis 504. The through holes 112 are formed in the base 502. In certain examples, the through holes 112 include a first geometry 506 and a second geometry 508. The first geometry 506 may smaller than the second geometry 508. In one example, the first geometry 506 is sized to admit the fastener 106, while the second geometry 508 is sized to admit the projection 204 of the shear stud 104. Alternatively, the first geometry 506 and the second geometry 508 may be similarly sized.

The clevis 504 is shown as a portion of the bracket 102 that extends perpendicular from the base 502. As shown, the clevis 504 includes a first ear 510 and a second ear 512. Alternatively, fewer or more than two ears may be incorporated into the clevis design. The attachment point 504 also includes a mounting hole 514 formed into the ears 510 and 512. The mounting hole 514 facilitates connection of another element or structure to the bracket 102 to form a connection with the structure 110. While a specific shape and arrangement in shown for the bracket 102, other shapes and arrangements may be used.

Figure 6:
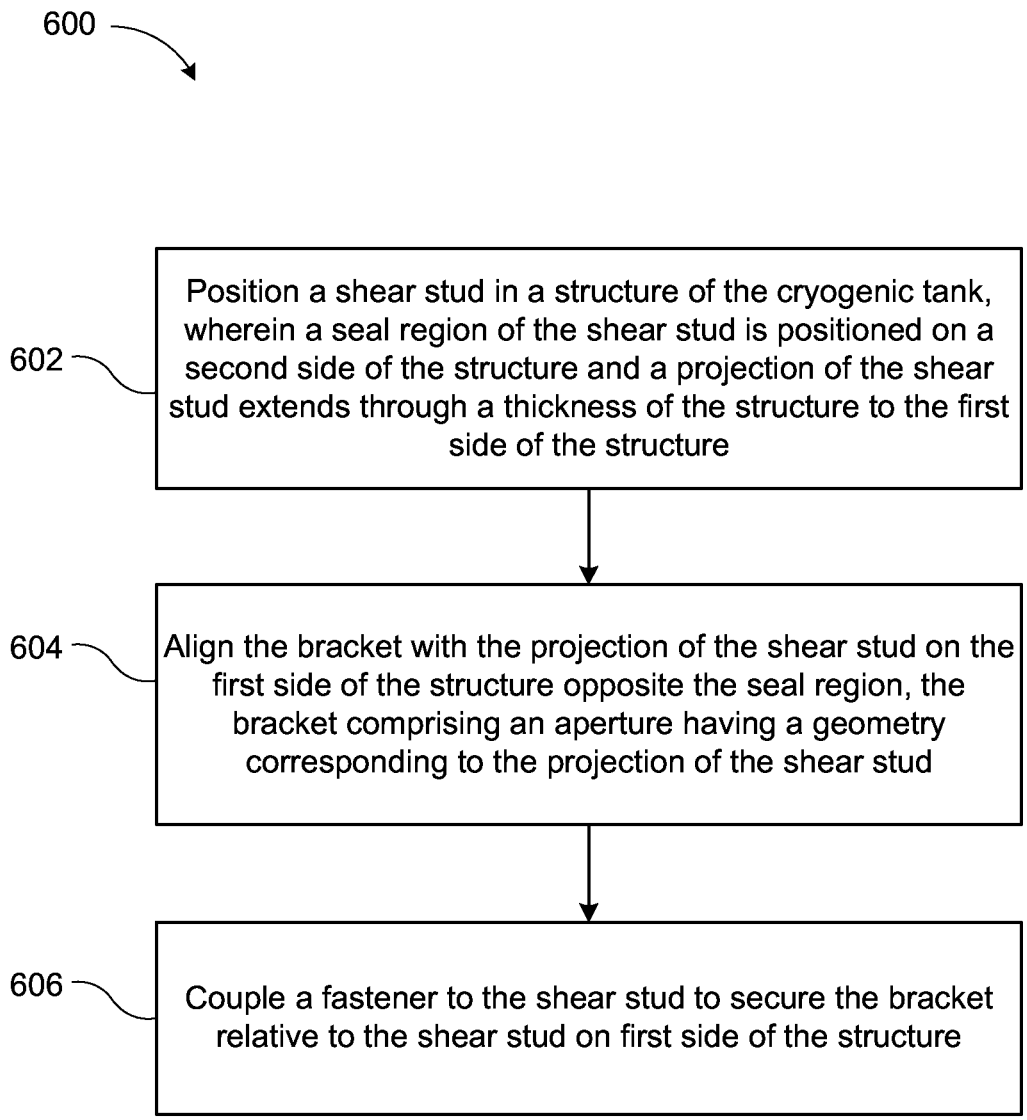
FIG. 6 is a schematic flow chart of a method including coupling a bracket to a structure, according to one or more examples of the present disclosure.

Referring to FIG. 6, according to some examples, disclosed herein is a method 600 of coupling a bracket 102 to a structure 110. The method includes (block 602) positioning a shear stud 104 in a structure 110 of the cryogenic tank such that seal region 202 of the shear stud 104 is positioned on a second side 122 of the structure 110 and a projection 204 of the shear stud 104 extends through a thickness of the structure 110 to the first side 120 of the structure 110.

The method 600 also includes (block 604) aligning the bracket 102 with the projection 204 of the shear stud 104 on the first side 120 of the structure 110 opposite the seal region 202. The bracket 102 includes a through hole 112 having a geometry corresponding to the projection 204 of the shear stud 104.

The method 600 also includes (block 606) coupling a fastener 106 to the shear stud 104 to secure the bracket 102 relative to the shear stud 104 on first side 120 of the structure 110.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An attachment system for providing a component mounting location, the attachment system comprising:
   a structure comprising a first side, a second side, opposite the first side, and a hole extending from the first side to the second side;
   a bracket comprising an interface surface, configured to interface with the first side of the structure, and a through hole open at the interface surface;
   a shear stud configured to interface with the second side of the structure, the shear stud comprising:
      a projection extending along a central axis of the shear stud and shaped to pass through the hole of the structure and engage the through hole of the bracket; and
      a seal region surrounding the projection of the shear stud and positioned to interface with the second side of the structure to form a seal with the second side of the structure; and
   a fastener comprising a head and a shaft, the shaft being shaped to pass through the through hole in the bracket and engage the shear stud to secure the shear stud relative to the bracket thereby reducing shear at the fastener.

2. The attachment system according to claim 1, wherein the seal region further comprises a seal element to form the seal between the first side of the structure and the second side of the structure.

3. The attachment system according to claim 2, wherein the seal region further comprises a second seal element to form a redundant seal between the first side of the structure and the second side of the structure.

4. The attachment system according to claim 2, wherein the first seal element comprises a flexible material.

5. The attachment system according to claim 2, wherein the first seal element is a flexible c-channel ring disposed in the seal region.

6. The attachment system according to claim 1, wherein at least one of the shear stud or the bracket further comprises an alignment feature to orient the shear stud relative to the bracket to correspond to a geometry of the structure.

7. The attachment system according to claim 1, further comprising a loading element to apply a load at the fastener.

8. The attachment system according to claim 7, wherein the loading element comprises a disc spring.

9. The attachment system according to claim 1, wherein at least one of the interface surface of the bracket or the seal region of the shear stud comprises a non-planar geometry corresponding to a non-planar geometry of the first side or the second side, respectively, of the structure.

10. The attachment system according to claim 1, wherein the structure is a thin-wall composite forming a portion of a cryogenic tank.

11. The attachment system according to claim 1, wherein at least one of the bracket or the shear stud comprises a material having a similar thermal characteristic to the structure.

12. A shear stud comprising:
   a seal region extending radially outward from a central axis to a periphery of the shear stud;
   a projection extending out from the seal region and along the central axis;
   a receptacle formed in a center of the projection to be open at an end of the projection distal from the seal region and to extend into the projection along the central axis, the receptacle shaped to receive a fastener;
   a closed face positioned on a side of the seal region opposite the projection, the closed face extending from the central axis to the periphery of the shear stud; and
   an alignment feature formed in the projection, at the end of the projection distal from the seal region, wherein the alignment feature defines a non-round portion of the projection.

13. The shear stud of claim 12, wherein the seal region further comprises a first seal element disposed within a first seal channel.

14. The shear stud of claim 13, wherein the seal region further comprises a second seal element disposed within a second seal channel concentric with the first seal channel.

15. The shear stud of claim 12, wherein the receptacle extends through the projection without extending through the closed face.

16. The shear stud of claim 12, wherein the receptacle comprises a removeable sleeve.

17. A method of coupling a bracket to a first side of a structure, the method comprising:
   positioning a shear stud in a hole of the structure, extending from the first side of the structure to a second side of the structure, so that, a seal region of the shear stud is positioned on the second side of the structure and so that a projection of the shear stud extends through the hole of the structure to a location beyond the first side of the structure, wherein the seal region surrounds the projection;

aligning a through hole of the bracket with the projection of the shear stud, engaging the through hole with the projection of the shear stud, and interfacing an interface surface of the bracket with the first side of the structure, wherein the through hole has a geometry corresponding to the projection of the shear stud; and passing a shaft of a fastener, comprising a head coupled to the shaft, through the through hole of the bracket so that the shaft engages the shear stud to secure the bracket relative to the shear stud on the first side of the structure and to form a seal between the seal region of the shear stud and the second side of the structure.

18. The method of claim 17, further comprising disposing a loading element between the fastener and the bracket to apply a loading force on the fastener.

19. The method of claim 17, wherein aligning the bracket with the projection of the shear stud comprises positioning the projection to match an alignment feature of the shear stud with a corresponding portion of the bracket to facilitate a sealing engagement of the seal region of the shear stud with the structure.

20. The method of claim 17, wherein securing the bracket relative to the shear stud on the structure forms a sealing engagement between the seal region of the shear stud and the structure.

* * * * *